United States Patent [19]
Holland et al.

[11] Patent Number: 5,443,926
[45] Date of Patent: Aug. 22, 1995

[54] THERMOREGULATED BATTERY OF ACCUMULATORS, ESPECIALLY FOR AN ELECTRIC VEHICLE

[75] Inventors: Gunther Holland; Günter Jeremias, both of Budingen, Germany

[73] Assignee: Compagnie Europeenne D'Accumulateurs, Clichy, France

[21] Appl. No.: 143,787

[22] Filed: Nov. 1, 1993

[30] Foreign Application Priority Data

Nov. 2, 1992 [FR] France .................... 92 13086

[51] Int. Cl.⁶ .................................... H01M 10/50
[52] U.S. Cl. .................... 429/120; 180/68.5; 429/20
[58] Field of Search .............. 429/120, 20; 180/68.5

[56] References Cited

U.S. PATENT DOCUMENTS

| | | | |
|---|---|---|---|
| 746,289 | 12/1903 | Chamberlain | 429/120 |
| 1,152,247 | 8/1915 | Walker | 429/120 |
| 2,273,244 | 2/1942 | Ambruster | 429/120 |
| 3,259,523 | 7/1966 | Faris, Jr. et al. | 429/20 |
| 3,424,622 | 1/1969 | Dechert | 429/120 |
| 3,525,386 | 8/1970 | Grover | 429/120 |
| 3,745,048 | 7/1973 | Dinkler et al. | 429/120 |
| 3,940,285 | 2/1976 | Nickols et al. | 429/20 |
| 4,292,381 | 9/1981 | Klein | 429/120 |

FOREIGN PATENT DOCUMENTS

| | | | |
|---|---|---|---|
| 2635427 | 2/1978 | Germany . | |
| 2645261 | 4/1978 | Germany | 429/120 |
| 9210384 | 11/1992 | Germany . | |
| 864390 | 9/1981 | U.S.S.R. | 429/120 |

*Primary Examiner*—Wayne Langel
*Attorney, Agent, or Firm*—Foley & Lardner

[57] ABSTRACT

Enclosure for a battery of accumulators, including at least one wall. Provision is made to circulate a heat-transfer fluid in the vicinity of the wall. The structure for circulating the heat-transfer fluid includes, on the wall, an additional wall which extends substantially parallel to the wall of the enclosure and whose periphery is joined in a sealed manner to the wall of the enclosure, so that a space for the heat-transfer fluid is delimited between the wall of the enclosure and the additional wall, and at least one inlet orifice and one outlet orifice emerging into the space in order to allow circulation of the heat-transfer fluid.

13 Claims, 4 Drawing Sheets

THERMOREGULATED BATTERY OF ACCUMULATORS, ESPECIALLY FOR AN ELECTRIC VEHICLE

The present invention relates to a thermoregulated battery of electric accumulators.

The recent development of electrically propelled vehicles stems from many years of research in the field of batteries of electric accumulators.

It is endeavoured especially to optimize the operating conditions of such accumulators, so that the latter restore the maximum amount of electrical energy while the vehicle is being used and so that they have as long a lifetime as possible.

In this regard, it is known to be preferable to keep the batteries of accumulators at a substantially constant temperature, which corresponds to their optimum operating temperature both during their charge and during their discharge, irrespective of the outside-temperature conditions.

It is also known that it is paramount to even out the temperatures of all the batteries of the same vehicle, especially during the phase of charging the accumulators.

While being charged, all the batteries receive the same electric current for the same period of time. It is therefore necessary for them to have the same capabilities of storing energy in order to avoid some of the batteries being still insufficiently charged while others are already overcharged.

However, the batteries of a vehicle are not all subjected to the same temperature conditions.

On the one hand, the batteries are often joined together in large number in the same container. In this case, those which lie on the periphery of the container experience greater cooling than those located at the center of the container.

On the other hand, the batteries may be scattered around in various locations in the vehicle, for space-requirement and weight-distribution reasons.

The Sonnenschein France S.A. Company, a subsidiary of the assignee company, has for many years carried out research with this objective of evening out the temperatures of the batteries of a vehicle and has already filed, on 29th Apr. 1991, a utility model in Germany under No. G 9105260.2.

Devices are known, especially from this document, which are arranged on the outside of batteries and which allow a heat-transfer fluid to circulate in the vicinity of the walls of the batteries, causing heat exchange with the latter, in order to keep their temperature within a predetermined range of values.

However, such devices have a relatively high cost price and their effectiveness is not always satisfactory.

The present invention aims to supply a novel enclosure for a battery of accumulators which is simple and inexpensive and which includes, because of its manufacture, all the elements allowing a heat-transfer fluid to be circulated in its vicinity, without it being necessary to have recourse to external devices.

The present invention may be employed for batteries using various electrochemical couples, for example lead, nickel-cadmium or lithium batteries, or any other alkaline battery.

The subject of the present invention is an enclosure for a battery of accumulators, including at least one wall, in the vicinity of which wall means allow a heat-transfer fluid to be circulated, characterized in that the means for circulating the heat-transfer fluid include, on the said wall, an additional wall which extends substantially parallel to the said wall of the enclosure and whose periphery is joined in a sealed manner to the said wall of the enclosure, so that a space for the heat-transfer fluid is delimited between the wall of the enclosure and the said additional wall, and at least one inlet orifice and one outlet orifice emerging into the said space in order to allow circulation of the heat-transfer fluid.

According to the invention, the said at least one wall of-the enclosure receiving the additional wall can be a lateral wall, the upper wall or the bottom wall of the enclosure.

In practice, it is preferable to choose the wall or walls of the enclosure which have the greatest surface area, so as to promote heat exchange between the interior of the enclosure and the heat-transfer fluid.

Thus, for a parallelepipedal enclosure whose large dimension is the height, the two larger lateral walls, and optionally the two smaller lateral walls, advantageously receive an additional wall.

On the other hand, for an enclosure of small height, it may be more advantageous to equip the bottom wall of the enclosure, or even its upper wall, with an additional wall.

Advantageously, the additional wall is joined in a sealed manner to the wall of the enclosure by adhesive bonding or welding.

Preferably, a liquid such as water, optionally mixed with an antifreeze, is used as heat-transfer fluid.

In a preferred embodiment of the invention, the additional wall includes, on its periphery, bent-over edges allowing it to be fixed to the wall of the enclosure.

In a preferred variant of this embodiment, the second additional wall includes ribs projecting from the side of its bent-over edges, and having substantially the same thickness as the latter in order to define within the space a forced-circulation path for the heat-transfer fluid.

Preferably, the ribs are arranged substantially in parallel and in a staggered fashion in order to form baffles.

In a preferred embodiment of the invention, the enclosure for the battery, as well as the additional wall, are made from the same plastic, for example from filled polypropylene or from ABS.

Advantageously, the orifices for inlet and outlet of the heat-transfer fluid are extended by connecting sleeves which allow several battery enclosures to be connected together, in series or parallel connection.

BRIEF DESCRIPTION OF THE DRAWINGS

With the purpose of making the invention easier to understand,- an embodiment thereof, given by way of example and not limiting the scope of the invention, will now be described with reference to the appended drawing in which:

FIG. 1 shows, in perspective, an enclosure 1 for a battery of accumulators, of parallelepipedal general shape and whose large dimension is the height, which includes two large lateral faces 2 and 3, two small lateral faces 4 and 5, a bottom 6 and an upper wall 7.

Figure 1:
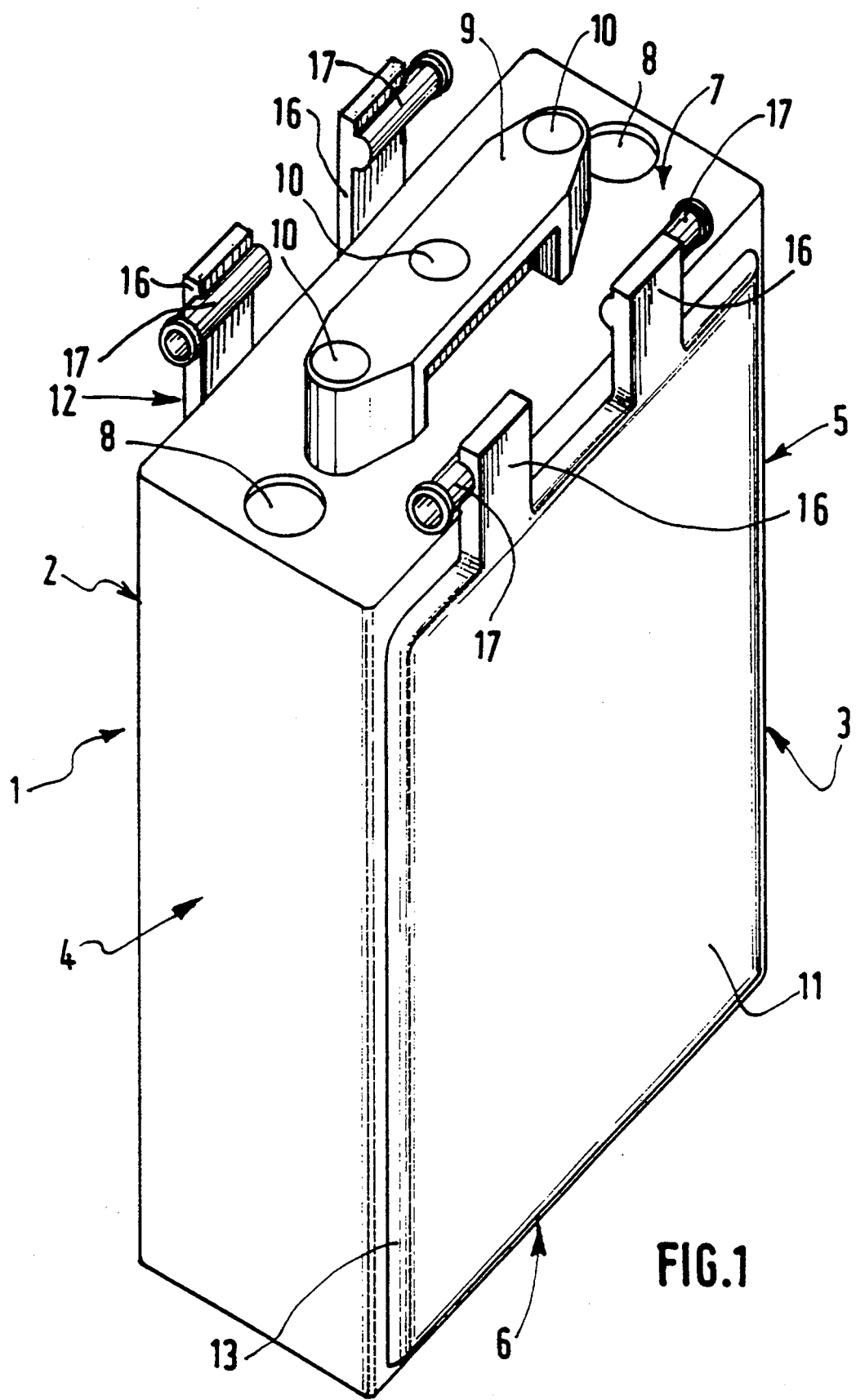
FIG. 1 is a perspective view of a battery enclosure according to a first embodiment of the invention.

The enclosure 1 is made from plastic, for example from filled polypropylene or from ABS.

The upper wall 7 of the enclosure includes two orifices 8 emerging inside the enclosure and allowing passage of electrical terminals, not shown, which are connected to accumulators housed inside the enclosure.

The upper wall 7 also includes a projecting portion 9 in which three orifices 10 are provided, which orifices also emerge inside the enclosure and which are intended to receive bungs, not shown, which act as valves.

The enclosure 1 shown here is intended to form a sealed, so-called maintenance-free, battery.

In accordance with the invention, the enclosure 1 is fitted, on each of its two large lateral faces 2 and 3, with an additional wall 11 and 12, respectively.

Although, in the embodiment shown here, the enclosure includes only two additional walls 11 and 12 on its large lateral faces 2 and 3, it is clear that, according to the invention, the enclosure could include additional walls also on its small lateral faces 4 and 5.

Figure 2:
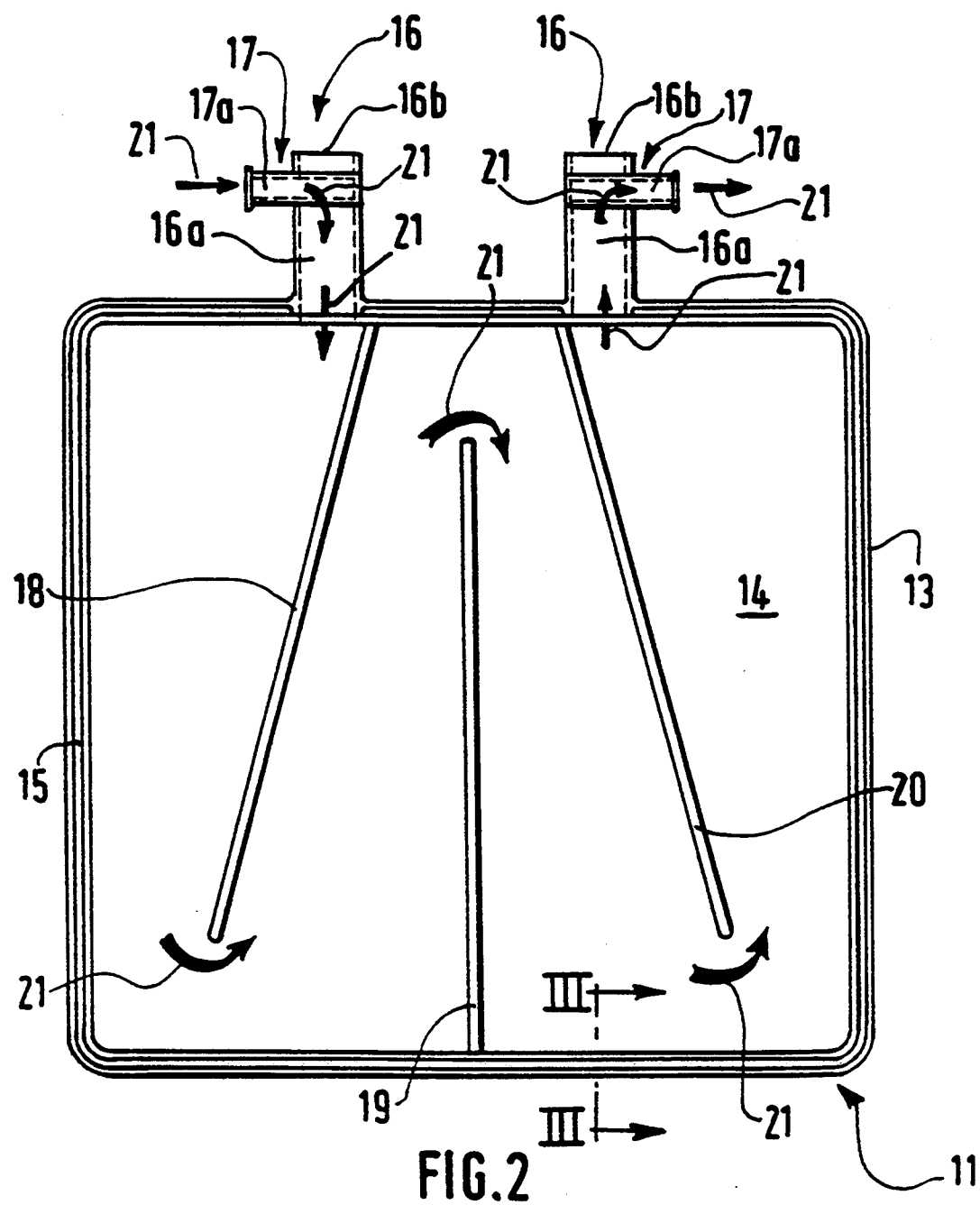
FIG. 2 shows an additional wall of the battery enclosure of FIG. 1, seen from the inside.
Figure 3:
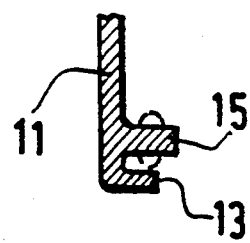
FIG. 3 is a view in section along III—III of FIG. 2.

Since the two additional walls 11 and 12 are strictly identical, the rest of the description will only relate to the additional wall 11 which is visible from the inside in FIG. 2.

In accordance with the invention, the additional wall 11 extends parallel to the wall 3 of the enclosure 1, being joined to the latter by its periphery.

The peripheral edge 13 of the additional wall 11 is oriented inwards and has a relatively small thickness compared to the height and to the width of the enclosure 1.

Because of this, the volume 14 which is delimited between the face 3 of the enclosure 1 and the additional wall 11 is relatively small.

An internal rib 15 extends parallel to the edge 13 of the additional wall 11.

In the embodiment shown, the additional wall 11 is joined to the enclosure 1 by welding its rib 15 on the lateral face 3 of the enclosure 1.

It is then understood that the purpose of the edge 13 is to conceal the bead which is produced in the region of the contact between the rib 15 and the face 3 of the enclosure during the welding.

In the section III—III, it should be noted that, before performing the welding, the rib 15 projects beyond the edge 13, which makes it possible to compensate for the plastic flow of material which occurs during the welding, the rib 15 then adopting the shape shown in broken lines.

The additional wall 11 includes, on its upper portion, two chimneys 16, the inner ducts 16a of which emerge vertically into the space 14, and the upper ends 16b of which are blocked of, for example by welding.

Each chimney 16 includes a connecting sleeve 17, the inner duct 17a of which communicates with the inner duct 16a of the chimney 16.

Ribs 18, 19 and 20 project from the inner face of the additional wall 11, extending from one of the upper or lower edges of the latter, towards the opposite edge.

As may be seen in FIG. 2, the ribs 18, 19 and 20 are arranged in a staggered fashion and define a baffle which forces the fluid to follow a predetermined path within the space 14.

Arrows 21 represent diagrammatically the path of the heat-transfer fluid.

Figure 4:
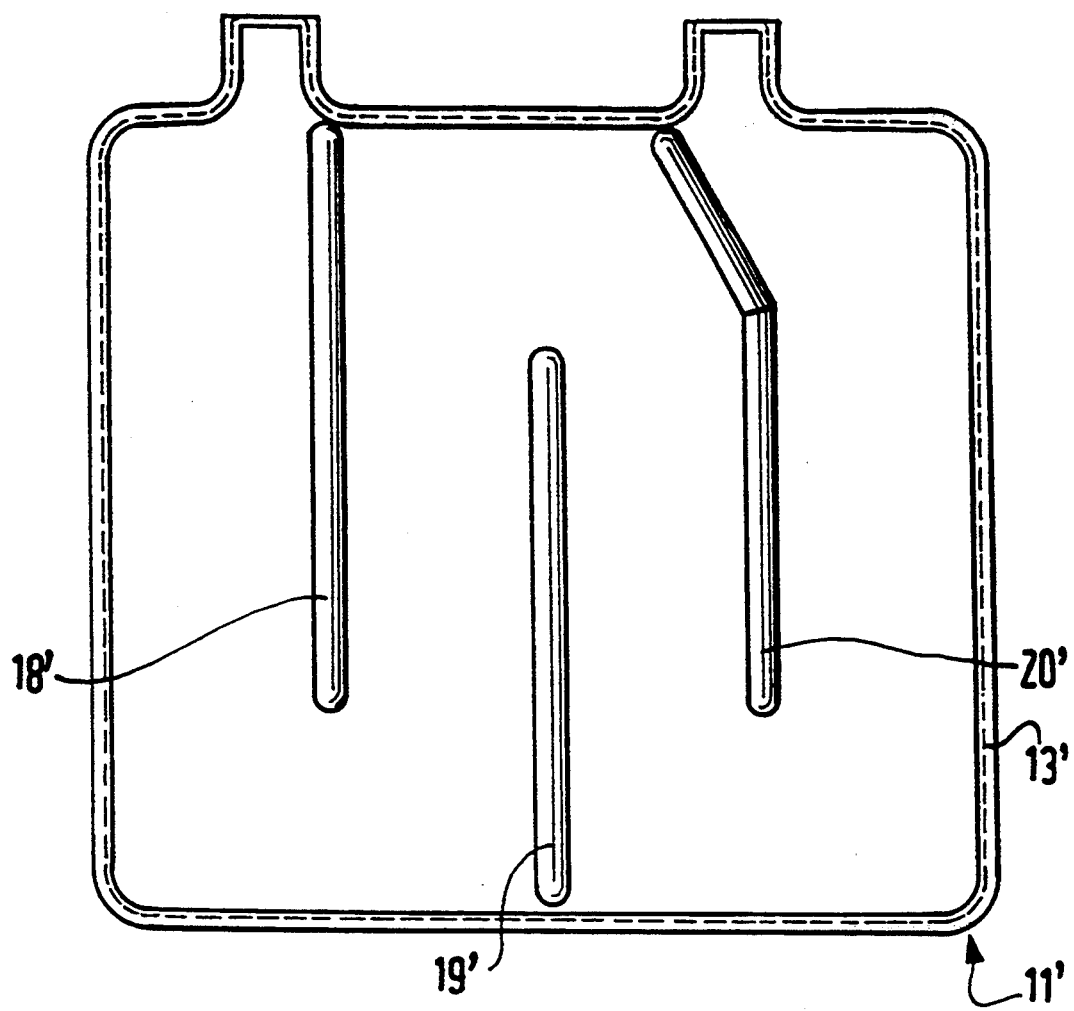
FIG. 4 is a view similar to FIG. 2 of a variant of an additional wall according to the invention and, FIG. 5 shows, in perspective, a battery enclosure according to a second embodiment of the invention.

FIG. 4 shows a variant of an additional wall 11', in which the ribs 18', 19' and 20' extend substantially vertically.

Unlike the additional wall 11 of FIG. 2, the additional wall 11' of FIG. 4 includes a peripheral edge 13' which does not act as a cover, the additional wall 11' being intended to be joined to the face 3 of the enclosure 1 by adhesive bonding of the edge 13'.

According to the invention, the ribs 18, 19, 20, 18', 19', 20' may be simply applied against the wall 3 of the enclosure.

They may also be welded or adhesively bonded to the wall of the enclosure, which improves both the circulation of the heat-transfer fluid and the mechanical strength of the additional wall thus firmly attached to the enclosure.

Figure 5:
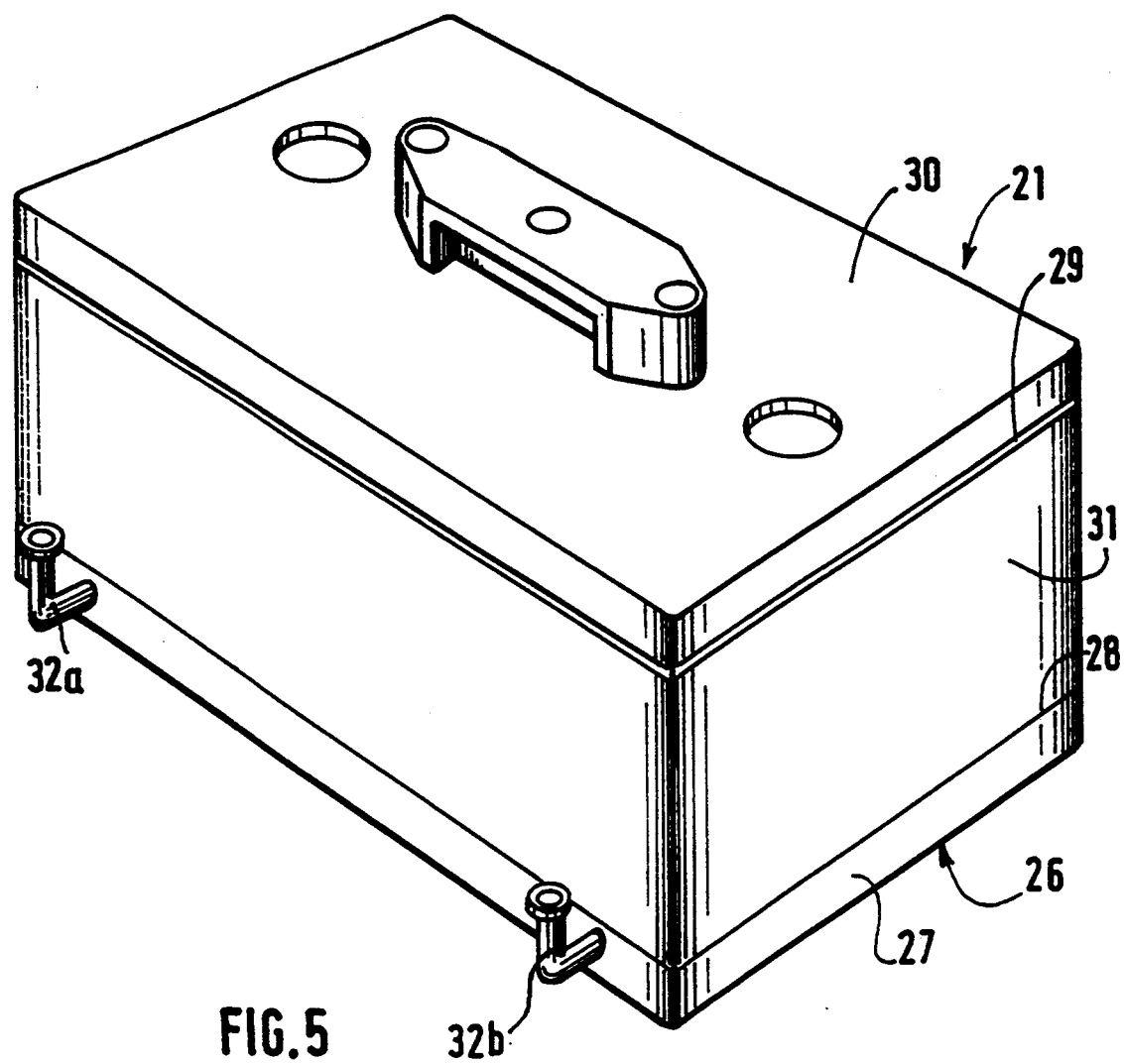

FIG. 5 illustrates a second embodiment of the invention, in which an enclosure 21 possesses, on its bottom wall 26, an additional wall 27 according to the invention.

The geometry of the enclosure 21, which has a relatively small height compared to its length and its width, leads naturally in fact to the bottom wall 26 being preferred as the wall intended to receive an additional wall 27.

Furthermore, tests performed on an enclosure of this type have revealed that it is in the lower portion of the enclosure that the greatest quantity of heat generated by the accumulators is present.

This configuration also has the advantage that the peripheral edge 28 of the additional wall 27 can be easily welded to the wall 26, with the aid of the same tool as that used for welding the peripheral edge 29 of the lid 30 of the enclosure to the body 31 of the latter.

In addition, on account of the fact that the edge 28 of the additional wall 27 lies in a barely visible portion of the enclosure 21, it is not necessary to hide the weld seam, nor even to trim the flash thereof.

The additional wall 27 includes two elbowed ducts 32a and 32b which form the inlet and outlet orifices allowing circulation of the heat-transfer fluid between the bottom wall 26 and the additional wall 27.

As illustrated previously, the additional wall 27 includes, on its face facing the bottom wall 26, ribs, not shown, which define a path for the heat-transfer fluid.

For the sake of the clarity of the drawing, the ducts 32a and 32b are shown on the same face of the enclosure 21, but it is clear that these ducts, which could moreover have a different shape, may be located on other faces of the enclosure.

It is understood that an enclosure according to the invention has the advantage of promoting heat exchange between a heat-transfer fluid and the interior of a battery on account of the fact that the fluid is isolated from the interior of the battery only by a single wall.

It is quite obvious that the embodiment which has just been described has no limiting character and that it would be possible to accommodate any desirable modification without departing thereby from the scope of the invention.

In particular, it is clear that the additional wall which has been illustrated here on two lateral walls or on the bottom wall of the enclosure could also be provided, according to the invention, on all the lateral faces or on the upper face of the enclosure.

We claim:

1. An enclosure for a circulation battery comprising: an enclosure having a plurality of walls;

an additional wall extending substantially parallel to one wall of said plurality of walls and whose periphery is joined in a sealed manner to said one wall, said additional wall forming a sealed hollow outside of said enclosure and between said one wall and said additional wall in order to contain heat-transfer fluid in said hollow, and at least one inlet orifice and one outlet orifice extending into said hollow in order to allow circulation of said heat-transfer fluid.

2. The enclosure according to claim 1, wherein said additional wall is joined to said one wall of said enclosure by adhesive bonding or welding.

3. The enclosure according to claim 1, wherein said additional wall and said enclosure are made from plastic.

4. The enclosure according to claim 1, wherein said additional wall includes, on its periphery, bent-over edges.

5. The enclosure according to claim 4, wherein said additional wall includes an internal rib extending parallel to its bent-over edges.

6. The enclosure according to claim 1, wherein said additional wall includes ribs projecting from the side of its bent-over edges.

7. The enclosure according to claim 6, wherein said ribs are arranged substantially in parallel and in a staggered fashion forming baffles.

8. The enclosure according to claim 1, wherein said inlet and outlet orifices are extended by connecting sleeves.

9. The enclosure according to claim 1, wherein said additional wall is on at least one side wall.

10. The enclosure according to claim 1, wherein said additional wall is on a bottom wall of said enclosure.

11. The enclosure according to claim 1, wherein said additional wall is on a top wall of said enclosure.

12. A sealed battery comprising the enclosure as claimed in claim 1.

13. An electromechanical battery comprising the enclosure as claimed in claim 1.

* * * * *